United States Patent [19]

Dighe et al.

[11] Patent Number: 5,728,193
[45] Date of Patent: Mar. 17, 1998

[54] PROCESS FOR RECOVERING METALS FROM IRON OXIDE BEARING MASSES

[75] Inventors: Shyam V. Dighe, N. Huntingdon, Pa.; William A. Morgan, Hamilton, Canada; Jerry L. Penland, Belleville, Ill.

[73] Assignee: Philip Services Corp., Columbia, Mo.

[21] Appl. No.: 434,372

[22] Filed: May 3, 1995

[51] Int. Cl.$^6$ ............... C21B 11/10; C01G 9/03
[52] U.S. Cl. ............ 75/10.19; 75/10.22; 75/10.3; 75/10.31; 75/961; 423/107; 423/DIG. 10
[58] Field of Search ............ 75/10.19, 10.22, 75/10.3, 10.31, 961; 423/107, DIG. 10

[56] References Cited

U.S. PATENT DOCUMENTS

| | | | |
|---|---|---|---|
| 4,072,504 | 2/1978 | Perdahl et al. | 75/40 |
| 4,310,350 | 1/1982 | Santen | 75/10 R |
| 4,323,391 | 4/1982 | Honda et al. | 75/14 |
| 4,508,566 | 4/1985 | Eriksson et al. | 75/88 |
| 4,655,437 | 4/1987 | Fritz et al. | 266/197 |
| 4,756,748 | 7/1988 | Lu et al. | 75/38 |
| 4,780,132 | 10/1988 | Dighe et al. | 75/10.22 |
| 4,802,919 | 2/1989 | Fey | 75/25 |
| 4,828,607 | 5/1989 | Dighe et al. | 75/10.22 |
| 4,917,723 | 4/1990 | Coyne, Jr. | 75/433 |
| 4,957,551 | 9/1990 | Aune et al. | 75/657 |
| 4,998,486 | 3/1991 | Dighe et al. | 110/346 |
| 5,084,093 | 1/1992 | Yamaoka et al. | 75/529 |
| 5,139,567 | 8/1992 | Matsuoka et al. | 75/500 |
| 5,188,658 | 2/1993 | Aune et al. | 75/10.31 |
| 5,244,488 | 9/1993 | Sato et al. | 75/10.19 |
| 5,279,643 | 1/1994 | Kaneko et al. | 75/499 |
| 5,338,336 | 8/1994 | Greenwalt | 75/445 |
| 5,364,447 | 11/1994 | Philipp et al. | 75/500 |

OTHER PUBLICATIONS

"The Plasma Torch: Revolutionizing the Foundry Fire", EPRI Journal, Oct. 1986.
"Industrial Plasma Systems", Westinghouse Electric Corp., Descriptive Bulletin 27-501, pp. 1-16 (Oct. 1984).

*Primary Examiner*—Melvyn Andrews
*Attorney, Agent, or Firm*—Senniger, Powers, Leavitt & Roedel

[57] ABSTRACT

A process for recovering iron from an iron oxide bearing mass. The process includes forming a bed of lump coke in a vertical shaft furnace, feeding the iron oxide bearing mass and scrap metal onto the bed of lump coke and combusting the coke in the coke bed while injecting a plasma gas having a temperature greater than about 5,000° F. into the coke bed to form a reaction zone within the coke bed having a temperature in excess of 4,000° F. The iron oxide bearing mass and scrap metal fed onto the bed of lump coke is melted to form a molten phase containing molten iron oxide and molten scrap metal. The molten phase flows into the reaction zone and a film is formed on the lump coke within the reaction zone, the iron oxide in the film being reduced by carbon from the coke to form molten iron in a solid/liquid reduction. The molten iron is discharged from the furnace.

27 Claims, 2 Drawing Sheets

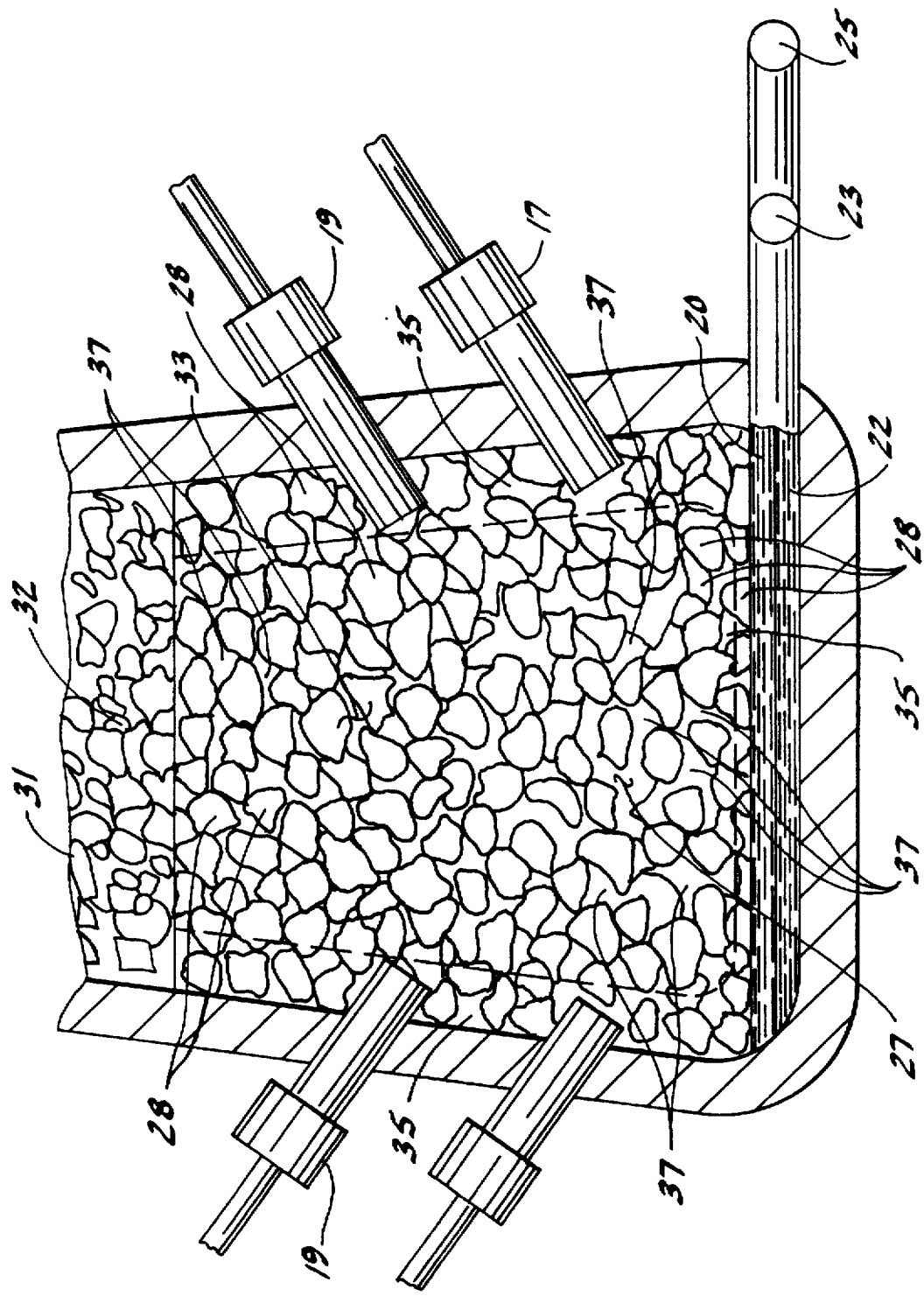

PROCESS FOR RECOVERING METALS FROM IRON OXIDE BEARING MASSES

BACKGROUND OF THE INVENTION

This invention relates to a process for recovering valuable metals such as iron and zinc from an iron bearing dust, residue or other material using a furnace.

Large quantities of dusts, residues and other materials bearing valuable metals (in oxide or metallic form) are generated annually. These materials include, for example, dusts generated in iron and/or steel melting furnaces, such as the electric arc furnace ("EAF"), which contain large quantities of iron oxide, zinc oxide and the like.

In U.S. Pat. No. 4,525,208, Yasukawa et al. suggest a method for recovering zinc and lead from iron and steel dust using an apparatus which includes a rotary kiln and a rotary smelting furnace. According to their process, the rotary kiln is charged with iron and steel dust and a reducing agent such as pulverized coke or coal to partially reduce the oxides. The partially reduced material is fed to the rotary smelting furnace where zinc and lead are reduced and volatilized and a molten mass is formed. The volatilized zinc is then oxidized with air and recovered as zinc oxide. The reoxidation of the zinc, however, undesirably creates relatively large volumes of exit gas. In addition, a two-stage process of this type typically will consume more energy and a greater initial capital investment than single stage processes.

In U.S. Pat. No. 4,612,041 a process is disclosed in which an electric furnace is used to recover iron and zinc from an iron bearing dust. In this process, an agglomerate formed from the iron bearing dust is fed to a shaft furnace where it is dried and pre-heated and in which hydroxides, carbonates, etc. in the iron bearing dust are removed. The agglomerates are then supplied to an induction furnace together with coke and reduced therein. Zinc is evaporated and recovered in the form of a metal zinc. Iron, lead and slag are molten in the induction furnace and separated and recovered. In general, this method consumes relatively large amounts of electricity and is uneconomical. In addition, slags are relatively difficult to control in an induction furnace and maintaining the required temperature for smelting is difficult unless a large quantity of metallics is retained in the furnace.

In U.S. Pat. No. 5,279,643, Kaneko et al suggest a process for recovering valuable metals from an iron dust in which an aluminum refining carbon sludge is mixed with the iron dust and an agglomerate is formed from the mixture. The agglomerate is fed into a shaft furnace along with lump coke and a flux and heated to a temperature of about 1000° to 1500° C. by means of combustion of the lump coke. Slag and metallic iron obtained by reducing the iron oxide are accumulated in their molten states and separately recovered. Volatile metals such as zinc, lead, and cadmium are evaporated and reoxidized into a crude oxide by air in the shaft furnace, and then discharged from the shaft furnace together with exhaust gas and recovered by the back filter. This process produces relatively large volumes of a high temperature exit gas which must be diluted with cool air to reduce the temperature in the filter. In addition, the response time for temperature control within the furnace is relatively slow.

SUMMARY OF THE INVENTION

Among the objects of this invention, therefore, is the provision of a process for the recycle and reuse of iron bearing dusts, residues and other materials which contain valuable quantities of metals; the provision of such a process which converts the raw materials into a plurality of usable and salable by-products such as the separate recovery of zinc, iron and a salable slag from EAF dust; and the provision of a process which may be readily and economically practiced.

Briefly, therefore, the invention is directed to a process for recovering iron from an iron oxide bearing mass. The process comprises forming a bed of lump coke in a vertical shaft furnace and feeding the iron oxide bearing mass and scrap metal, i.e., scrap steel or iron, onto the bed of lump coke. A plasma gas having a temperature greater than about 5,000° F. (2780° C.), preferably greater than about 8,000° F. (4500° C.), and more preferably greater than about 10,000° F. (5500° C.) is injected into the coke bed and the coke is combusted to form a reaction zone within the coke bed with the temperature in the reaction zone being in excess of about 4,000° F. (2260° C.). The iron oxide bearing mass and scrap metal are melted to form a molten phase containing molten iron oxide and molten scrap metal which flows into the reaction zone and forms a film on the lump coke within the reaction zone. The iron oxide in the film is then reduced by carbon from the coke to form molten iron in a solid/liquid reduction.

The present invention is also directed to a process for recovering metals from an agglomerate which contains iron oxide and zinc oxide. The process comprises forming a bed of lump coke in a vertical shaft furnace, feeding the agglomerate and scrap metal onto the bed of lump coke, and combusting the coke in the coke bed while blowing a plasma gas having a temperature greater than about 5,000° F. (2780° C.), preferably greater than about 8,000° F. (4500° C.), and more preferably greater than about 10,000° F. (5500° C.) into the coke bed to form a reaction zone within the coke bed. The temperature in the reaction zone is in excess of 4,000° F. (2260° C.). The zinc oxide is reduced to zinc metal which is vaporized and carried by an exhaust gas leaving the coke bed and the agglomerate and scrap metal fed onto the bed of lump coke are melted to form a molten phase containing molten iron oxide and molten scrap metal. The molten phase flows into the reaction zone and forms a film on the lump coke within the reaction zone with the iron oxide in the film being reduced by carbon from the coke to form molten iron in a solid/liquid reduction. The zinc is reoxidized to zinc oxide and recovered from the exhaust gas.

The present invention is further directed to a process recovering zinc from an agglomerate containing zinc oxide and the oxide of a non-volatile metal. The process comprises reducing the oxides of zinc and the non-volatile metal within a vertical shaft furnace. The metallic zinc is reduced and volatilized and then reoxidized within the shaft furnace using an oxidizing gas selected from the group consisting of carbon dioxide, steam, $HNO_3$, $NO_2$ and $SO_3$ to produce a crude zinc oxide. The crude zinc oxide is recovered from the exhaust gas.

Other objects and features of the invention will be in part apparent and in part pointed out hereinafter.

BRIEF DESCRIPTION OF THE DRAWINGS

FIG. 2 is a schematic cross-sectional view of the plasma-fired vertical shaft furnace for carrying out the process of the present invention with a part thereof broken away.

DETAILED DESCRIPTION OF THE INVENTION

Figure 1:
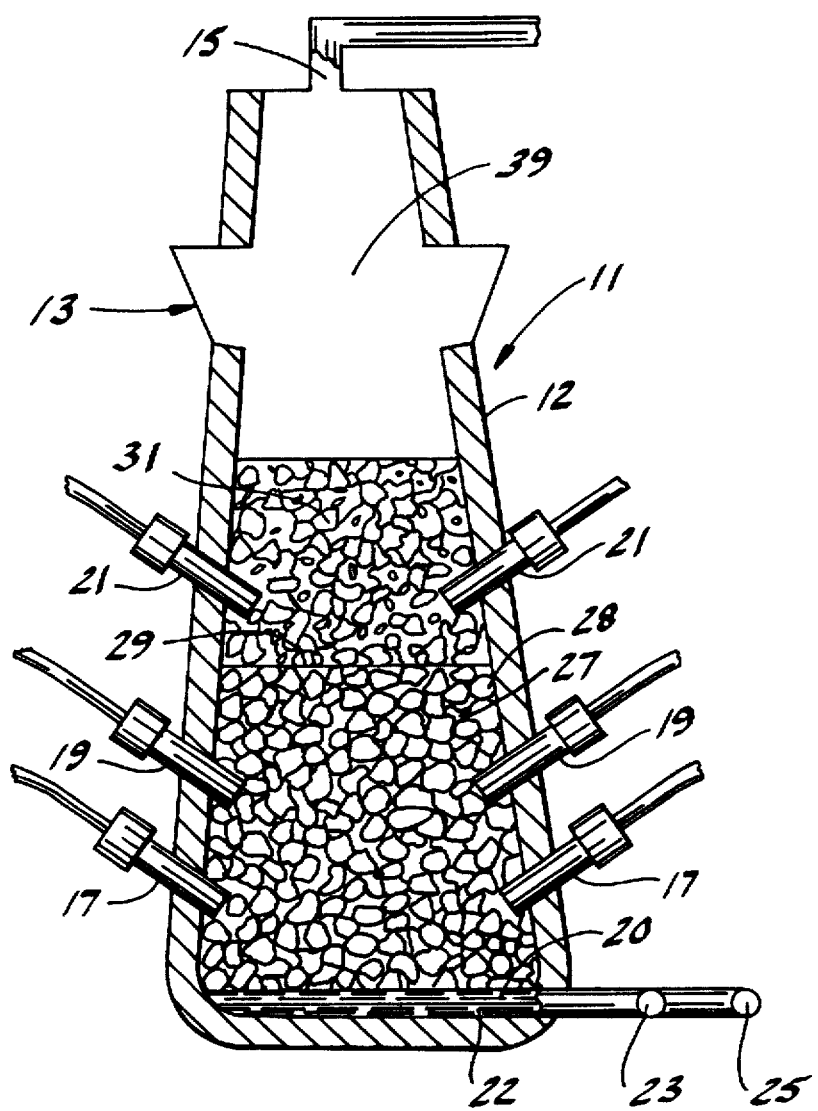
FIG. 1 is a schematic cross-sectional view of a plasma-fired vertical shaft furnace for carrying out the process of the present invention.

The process of the present invention enables the recycle and reuse of virtually any iron bearing material and is particularly well suited for the recovery of iron and zinc or other valuable metals from materials which have been categorized as hazardous such as EAF dusts. In addition, a mixture of materials can be used in accordance with this process, only one of which contains iron. Thus, zinc drosses, zinc hydroxide filter cake, materials containing hazardous levels of cadmium, lead, mercury, selenium, or chromium, oily mill scale, spent drums, oil filters, swarth (including non-metallics), liquid organics, and the like can be used in the process along with an iron bearing material.

The iron bearing material to be treated in accordance with the process of the present invention should be in the form of a mass having a size and shape which permits the flow of a gas through a packed bed of the material. Thus, EAF dusts and other particulate materials should be agglomerated to form a regularly shaped agglomerate and zinc drosses and other solid materials should be crushed and screened to select a mass having a size between about ½ inch (1.25 cm.) and about 4 inches (10 cm.), more preferably about 2.5 inches (6.25 cm.). As used herein, particle diameters (sizes) are determined by commercially available standard mechanical or air-operated sieves.

Agglomerates may be formed, for example, by admixing one or more dusts, residues or other materials (after grinding or drying, if necessary) with a binder such as molasses and charging the mixture to a pelletizer. Coke breeze may be incorporated into the agglomerate to provide intimate contact between the metal oxides and a carbon source during the process, thereby facilitating the reduction of the oxides. The agglomerate may additionally comprise a flux such as lime or silica.

Agglomerates formed from EAF and other iron bearing dusts are preferably formed from a mixture of the dust, coke breeze, flux and a binder. Typical compositional ranges for the agglomerated dust are as follows:

| Component | Weight % |
|---|---|
| Fe | 14–50 |
| ZnO | 8–45 |
| PbO | 0–25 |
| CaO | 4–15 |
| $SiO_2$ | 2.5–8 |
| C | 2.5–10 |
| binder | 5–15% |

The agglomerates preferably have a regular shape and are more preferably in the form of a "briquette."

Referring now to FIG. 1, the process of the present invention is carried out in a furnace such as vertical shaft furnace 11. The vertical shaft furnace 11 has an outer wall 12 and a charging port 13 through which the iron bearing mass, coke and other raw materials are fed. Exhaust gases produced during the process leave the furnace through exhaust port 15. Plasma torches 17 are connected to the lower portion of the furnace, blast air tuyeres 19 are connected to the furnace above the plasma torches 17, and oxidation gas tuyeres 21 are connected to the furnace above the blast air tuyeres 19. Slag 20 and iron 22 may be tapped from the furnace through tapholes 23,25, respectively, which are located near the base of the furnace 11.

The furnace 11 contains a bed 27 of metallurgical grade lump coke 28 which extends from near the bottom of the furnace 11 to a level 29 which is above the blast air tuyeres 19 but below the oxidation gas tuyeres 21. The plasma torches 17 extend into the coke bed 27 and terminate in a region (not shown) which is near the center of the coke bed 27 at its base. The depth of the coke bed for a shaft furnace having an internal diameter of about 90 to 120 inches (2.25–3 meters), for example, will typically be in the range of about 24 to 36 inches (60 cm–90 cm.). Preferably, the plasma torch will be situated at the base of the coke bed and penetrate far enough into the coke bed to retain an insulating cover for the torch. Suitable plasma torches are commercially available from Westinghouse Electric Corporation (Pittsburgh, Pa.) and other vendors.

On top of the coke bed 27 is a bed 31 which comprises the mass of iron bearing material, metallurgical grade lump coke, and pieces of scrap metal such as scrap steel or scrap iron. If sufficient flux is not otherwise associated with the iron bearing mass (e.g., by incorporating the flux with an iron bearing dust in an agglomerate), the bed 31 should additionally comprise a flux such as limestone, silica, dolomite, or quicklime. The bed 31 extends from the top of the coke bed to a level above the oxidation gas tuyeres 21.

In operation, an electrically induced, plasma gas having a temperature in excess of 5,000° F. (2780° C.), preferably greater than about 8,000° F. (4500° C.), and more preferably greater than about 10,000° F. (5500° C.), is injected into the coke bed 27. Although alternative embodiments may be used, in this embodiment the plasma gas is directed in a generally upward direction from the nozzles (not shown) of the plasma torches 17. The plasma gas is preferably air which has been passed through a direct current electric arc and is carrying entrained coke breeze. In general, the number of plasma torches used is a function of the furnace diameter and torch energy production with three to six, 2 megawatt torches being preferred, for example, for shaft furnaces having an internal diameter in the range of about 90 to 120 inches (2.25–3 meters).

Unlike conventional processes for the recovery of iron and zinc from iron bearing dusts which rely upon the combustion of coke as the primary source of energy for smelting, the present process relies upon the plasma gas as a significant source of energy. This feature provides a number of advantages. For example, temperatures can be controlled by varying the torch power level with the response time for such control being on the order of several minutes. As a result, the energy input to the furnace can be rapidly adjusted as the oxide content of the feed, and thus the energy required for smelting, is varied. In addition, because less air is required for combustion, the rate of gas flow through the furnace is advantageously decreased. In general, at any given time approximately 20% to 60% of the energy input to the furnace will be derived from the plasma gas and approximately 80% to 40% of the energy input will be derived from the lump coke and coke breeze, with the amount of energy derived from the plasma gas, on average, being about one-half of the energy requirements for the process.

Simultaneous with the injection of the plasma gas, pre-heated air and coke breeze are injected through the blast air tuyeres 19. Although they may alternatively be positioned below the plasma torches, the blast air tuyeres 19 as depicted in FIG. 1 are preferably located above the plasma torches and direct the pre-heated air and coke breeze in a generally horizontal direction into the coke bed. The number of blast air tuyeres required for a given furnace is primarily a function of the internal diameter of the furnace but, in general, at least three blast air tuyeres are preferred for shaft furnaces having an internal diameter in the range of about 90 to 120 inches (2.25–3 meters). The plasma torches may alternatively be set into the main blast air tuyeres with coke breeze injected via small blast air tuyeres. The temperature of the pre-heated air is preferably at least about 500° C. Typically, more air is provided to the furnace through the blast air tuyeres than through the plasma torches with the volumetric ratio of the air injected via the plasma torches to the air injected via the blast air tuyeres being between about 1:1 and about 1:10 with about 200–300 CFM of air passing through the plasma torches at standard conditions for a 2 megawatt plasma torch.

Referring now to FIG. 2, the plasma gas superheats the lump coke 28 in reaction zone 33 (the region of coke bed 27 surrounded on three sides by the dashed line) to a temperature of at least 4,000° F. (2260° C.), preferably at least 5,000° F. (2780° C.). To protect the outer wall 12 of the furnace, the flow of the plasma gas from plasma torches 17 and air from the blast air tuyeres 19 is controlled to maintain a colder, insulating layer 35 of coke (the region of coke bed 27 between the dashed line and the wall 12 of the furnace) which surrounds the reaction zone 33. Within the reaction zone 33, lump coke and coke breeze are combusted, resulting in the formation of an intensely hot and highly reducing exhaust gas which rises from the coke bed 27 and enters bed 31. Preferably the temperature of the exhaust gas entering the bed 31 is at least 3,000° F. (1660° C.) and more preferably between about 3,000° F. (1660° C.) and about 3,700° F. (2050° C.).

Bed 31 in a region 32 immediately above the reaction zone 33 is heated by the rising exhaust gas to a temperature between about 3,000° F. (1660° C.) and 3,700° F. (2050° C.), preferably about 3,400° F. (1850° C.). At this temperature, the iron bearing mass, scrap metal and flux are melted to form a molten phase. The molten scrap metal adds volume to the molten phase and thus aids in the dispersion of the oxides of non-volatile metals and the flux incorporates substances other than iron to form a slag which can be separated from the metallic iron. The molten phase flows downward into coke bed 27, passes through the free-space 37 between the lumps of coke 28 in coke bed 27 and forms a thin film, i.e., a film having a thickness between about 0.06 inches (1.5 mm) and about 0.15 inches (3.75 mm), on the surface of the lump coke. The iron oxide and oxides of other non-volatile metals such as copper, nickel and chromium present in the molten phase are reduced to metals on the solid carbon surface of the coke. Carbon diffuses into the film aided by the very high temperatures and large heat transfer rates with air. In addition, the diffusion is aided by the evolution of carbon monoxide gas which increases the effective surface area of the film, thereby increasing the passive boundary layer. The primary reduction taking place in the reaction zone is thus a liquid phase/solid phase smelting reaction; carbon monoxide generated by the combustion of the lump coke and the coke breeze is a secondary reducer of the non-volatile metal oxides. The metallic iron and slag continues flowing downward through the coke bed 27 until it reaches the bottom of the vertical shaft furnace 11. From there, the slag 20 and molten iron 22 are withdrawn from the furnace via tapholes 23,25, respectively.

In addition to causing the melting of the scrap metal and the iron bearing mass, the intensely hot and highly reducing exhaust gas also causes the reduction of the oxides of volatile metals and the vaporization of any metals such as lead, cadmium, and zinc present in region 29. The vaporized metals are then carried by the exhaust gas and leave the furnace 11 through exhaust port 15. If the exhaust gas does not contain contaminants such as alkali metals or various halides such as sodium chloride and sodium fluoride, zinc may be recovered from the exhaust gas in a splash condenser or the like. If the exhaust gas contains alkali metals or halides as is typically the case with exhaust gases produced by the smelting of EAF and other iron bearing dusts, however, it is preferred that the zinc or other volatile metal be reoxidized using an oxidizing gas such as carbon dioxide, steam, $HNO_3$, $NO_2$ or $SO_3$. These oxidizing gas are preferred over air because the use of such a gas results in a substantial reduction in the volume of exhaust gas as compared to what would result from the use of air as the oxidizing gas.

The oxidizing gas is injected into the furnace through oxidation gas tuyeres 21. In this region, the temperature of the bed 31 is between about 450° C. and about 850° C., and thus, the reoxidized zinc will immediately nucleate or condensate and be in the form of a fine particulate which is entrained in the ascending gas stream. Preferably, the oxidizing gas is carbon dioxide and the amount of carbon dioxide is sufficient to provide an excess of more than 50% of the carbon dioxide which would be required stoichiometrically to oxidize the zinc. After the exhaust gas exits the bed 31, it enters the upper cupola region 39 which has a temperature in the range of about 300° C. and it is then carried out of the furnace 11 by the exhaust gas. Importantly, the exhaust gas velocity is based on the inner diameter of the shaft furnace and is maintained such that the exhaust gas can entrain the reoxidized zinc oxide and carry it out of the furnace with the exit gases and, in addition, to control the reaction temperature between the carbon dioxide and the zinc vapor. The zinc oxide is separated from the exhaust gases in a cyclone and bag house (not shown). Thereafter, the exhaust gas which contains carbon monoxide may be burned to generate heat followed by recovery of that heat in the form of steam or electricity.

Zinc oxide which has been recovered from the exhaust gas may be used directly in the production of zinc metal. Because the recovered zinc oxide is contaminated, however, with sodium chloride, sodium fluoride, iron oxides, lead oxides, or other minor impurities, some primary zinc metal producers will not accept the zinc oxide in this form. To be salable to such producers, therefore, it may be desirable to further refine the zinc by dissolving it in caustic and subjecting it to an electrowinning process.

As the iron bearing mass, scrap metal and flux in bed 31 are melted, bed 31 is continuously replenished by feeding additional iron bearing mass, scrap metal and flux into the furnace 11 via charging port 13. Similarly, as lump coke in reaction zone 33 is consumed by combustion, lump coke is continuously fed to the top of bed 31 via charging port 13. Ideally, these materials are charged at a rate which corresponds to their consumption and as a result, the level of the coke bed 27 and bed 31 remain approximately constant.

When the iron bearing mass is EAF dust or a comparable iron bearing dust or residue, the agglomerated dust, lump coke, scrap metal and flux are charged to a vertical shaft furnace with the weight ratio of agglomerated dust to scrap metal being between about 1:3 and 3:1. When the weight ratio of agglomerated dust to scrap metal exceeds about 3:1, experience to date has shown that the throughput of the furnace is decreased and that coke consumption increases. At these ratios, there is greater potential for freezing of the slag and the plasma has to be used for longer periods of time to provide relief from these problems. In addition, when the weight ratio of agglomerated dust to scrap metal is less than about 1:3, experience to date has shown that the process is relatively uneconomical. Because of the relatively high price of scrap, the higher ratios of oxides to steel scrap provide the major advantages of the process and more available zinc. The amount of lump charged to the furnace will depend, in part, upon the relative proportion of agglomerated dust to scrap metal; in general, however, the weight ratio of agglomerate and scrap metal to coke will be between about 13:1 and about 10:1 with greater proportions of coke required with increasing proportion of agglomerated dust. Similarly, the requirement for flux increases with increasing agglomerate.

As previously noted, the plasma gas and the air injected through the blast air tuyeres preferably carries entrained coke breeze. The coke breeze is preferably fed to the reaction zone 33 to maintain the carbon content of the iron product at a concentration above 3.5% and to ensure that FeO is fully reduced from the slag. The amount of coke breeze injected into the furnace through the plasma torches and blast air tuyeres will depend upon the process, but in general, the weight ratio of lump coke charged to bed 31 to coke breeze injected through the plasma torches and blast air tuyeres will be between about 1:1 and 2:1.

A wide variety of materials may be used as the scrap metal. The scrap metal may be virtually any metal which will contribute to the formation of a molten phase in the vertical shaft furnace 11 and thereby aid in the dispersion of the molten oxides. In general, however, iron-containing, steel-containing and zinc-containing materials are preferred. For example, the scrap metal may be lead, zinc, rubber, plastic coated steels or contaminated steels such as shredded drums, oil filters and the like. In addition, the scrap metal should have a size and shape such that when it is charged into the furnace 11 along with the coke and scrap to form bed 31, it will not cause obstructions (e.g., bridging) in the furnace and it will provide sufficient free-space to permit the upward flow of exhaust gases from the coke bed 27 through the bed 31. Scrap metal having no dimension greater than about 5 centimeters has been found to work well.

In addition to the various scrap metals which may be used, the process of the present invention can be used to recycle a wide variety of non-metallics. For example, swarth may be used as a flux and liquid organics or other carbonaceous materials may be used as a source of fuel in place of coke breeze. The furnace environment is such that the organics will be fully combusted and heavy metals will be vitrified in a salable slag which has been demonstrated to consistently pass leachability tests such as RCRA and TCLP tests.

The following examples will illustrate the invention.

EXAMPLE 1

A series of tests for recovering iron and zinc from agglomerated EAF dust were carried out in a plasma-fired vertical shaft furnace having an inner diameter of 36 inches in accordance with the invention described herein. The start-up conditions involve charging metallurgical coke into the furnace to produce a bed of approximately 55 inches above the tuyeres. The coke is then ignited by firing the plasma torch for ten minutes at 800 KW power with 300 SCFM of combustion air through the main tuyere, 300 SCFM of combustion air through the secondary tuyeres. The combustion air is split evenly between the main and secondary tuyeres to maintain a level coke bed during the heat up period. The torch is fired for two ten minute periods with the combustion air rates indicated above. The bed height is measured before and after each firing so that it can be adjusted (allowed to burn down) so that it is between 24 and 36 inches above the tuyere at the end of the heat up period. If the bed is above 36" torch blowing continues. When the bed falls between 24", coke is added.

Process material charging is started by filling the furnace with the charge materials to about 140 inches above the center line of the tuyere. Charging of the material, while running, is based on maintaining a uniform bed height of between 140–155 inches above the tuyere. The materials were preblended in the desired ratios before charging. During the initial stage of charging the fluxing rate (or limestone addition) is higher to flux out the remainder of the coke ash formed during the furnace preheat. The total blast during this phase will be about 600 SCFM and is divided with 500 SCFM through the main tuyere and 100 SCFM total through the secondary tuyeres. More air is provided thorough the main tuyere to maintain a mixed air temperature in the tuyere of 5000° F. (2780° C.). Of the total blast rate, 17% is directed to the secondary tuyeres to prevent a frozen build up forming on the side of the shaft. The torch power is maintained at approximately 800 KW, based on a melt rate of 2.5 to 3 ton/hr. Coke breeze is injected through the tuyeres to maintain the carbon content of the iron produced at a level above 3.5% and to ensure that FeO is fully reduced form the slag.

The composition of the feed and the feed rate are presented in Table I.

TABLE I

Summary of Three Tests in Vertical Shaft Furnace

| Test No. | 1 | 2 | 3 |
|---|---|---|---|
| 1. Feed | | | |
| Steel | 75% | 50% | 25% |
| Pellets | 25% | 50% | 75% |
| 2. Charge Composition (lbs.) | | | |
| Steel | 225 | 150 | 75 |
| Pellets | 75 | 150 | 225 |
| Coke | 25 | 30 | 40 |
| Sandstone & Limestone | 4 | 16.5 | 1.2 |
| 3. Feed Rate | | | |
| Tons/hr. (iron) | 2.1 | 1.7 | 0.8 |
| 4. Charge Cycle Time | | | |
| Minutes | 3.2 | 3.0 | 4.6 |
| 5. Number of Charges | 15 | 10 | 12 |
| 6. Operating Parameters | | | |
| Plasma Torch Power Kw | 935 | 1200 | 1490 |
| Total Air Flow scfm | 450 | 450 | 475 |
| Gas Vel. scfm/sq. in. | 0.64 | 0.64 | 0.68 |
| Coke Breeze lb/min. | 3.1 | 4.0 | 7.0 |
| 7. Test Duration | 40 | 30 | 55 |

| Output Performance For Test No. 3 | |
|---|---|
| Total Recovery of Iron in Feed as metallic iron in product | 99.5% |
| Total Loss of Iron in Slag | 0.45% |
| Total Recovery of Zinc metallic in Feed as zinc on oxide in product | 98.1% |
| Total Loss of Zinc in Slag | 0% |
| Total Loss of Zinc in Iron | 0% |
| Plasma Torch energy at 85% Efficiency | 654,377 Kcals/hr. |
| Coke Energy | 646,251 Kcals/hr. |

Carbon Content of Iron was 3.2–5.9% with an average of 4.4%.

The slag was recovered with the iron as a molten product which was easily separated after cooling and solidification. The slag product passed a TCLP analysis and was suitable as a landfill material.

| Composition of Off Gas For Test No. 3 | |
|---|---|
| | wt. % |
| CO | 33.7 |
| $CO_2$ | 6.1 |
| $N_2$ | 44.0 |
| CaO | 0.8 |
| ZnO | 11.0 |
| PbO | 1.3 |
| $H_2O$ | 3.8 |

It should be noted that the data presented for the output performance and composition of the off-gas are presented for the 25% scrap metal/75% EAF pellets run (Test No. 3) only. It should also be noted that the amount of energy consumed per ton of liquid metal produced and per ton of feed increases particularly in per ton of feed because more oxides need to be reduced. There is also an increase in consumption of coke and particularly coke breeze.

In view of the above, it will be seen that the several objects of the invention are achieved.

As various changes could be made in the above compositions and processes without departing from the scope of the invention, it is intended that all matter contained in the above description be interpreted as illustrative and not in a limiting sense.

What is claimed is:

1. A process for recovering iron from an iron oxide bearing mass, the process comprising forming a bed of lump coke in a vertical shaft furnace, feeding the iron oxide bearing mass and scrap metal onto the bed of lump coke, combusting the coke in the coke bed while injecting a plasma gas having a temperature greater than about 5,000° F., into the coke bed to form a reaction zone within the coke bed, the temperature in the reaction zone being in excess of 4,000° F., melting the iron oxide bearing mass and scrap metal fed onto the bed of lump coke to form a molten phase containing molten iron oxide and molten scrap metal, the molten phase flowing into the reaction zone and forming a film on the lump coke within the reaction zone, the iron oxide in the film being reduced by carbon from the coke to form molten iron in a solid/liquid reduction, and discharging the molten iron from the furnace.

2. A process as set forth in claim 1 wherein the iron oxide bearing mass is agglomerated EAF dust.

3. A process as set forth in claim 1 wherein the plasma gas has a temperature in excess of about 8,000° F.

4. A process as set forth in claim 1 wherein the plasma gas has a temperature in excess of about 10,000° F.

5. A process as set forth in claim 1 wherein the iron oxide bearing mass is agglomerated EAF dust and the weight ratio of agglomerated EAF dust to scrap metal is between about 1:3 and 3:1.

6. A process as set forth in claim 1 wherein the plasma gas provides between about 40% and about 60% of the energy input into the furnace.

7. A process for recovering metals from an agglomerate which contains iron oxide and zinc oxide, the process comprising forming a bed of lump coke in a vertical shaft furnace, feeding the agglomerate and scrap metal onto the bed of lump coke, combusting the coke in the coke bed while blowing a plasma gas having a temperature greater than 5,000° F. into the coke bed to form a reaction zone within the coke bed, the temperature in the reaction zone being in excess of 4,000° F., reducing the zinc oxide to zinc metal which is vaporized and carried by an exhaust gas leaving the coke bed, melting the agglomerate and scrap metal fed onto the bed of lump coke to form a molten phase containing molten iron oxide and molten scrap metal, the molten phase flowing into the reaction zone and forming a film on the lump coke within the reaction zone, the iron oxide in the film being reduced by carbon from the coke to form molten iron in a solid/liquid reduction, and reoxidizing the zinc to zinc oxide, and recovering the reoxidized zinc oxide from the exhaust gas.

8. A process as set forth in claim 7 wherein the zinc is reoxidized to zinc oxide by an oxidizing gas which is fed to the vertical shaft furnace.

9. A process as set forth in claim 7 wherein the zinc is reoxidized to zinc oxide by carbon dioxide which is fed to the vertical shaft furnace.

10. A process as set forth in claim 7 wherein the plasma gas has a temperature in excess of about 10,000° F. (5500° C.).

11. A process as set forth in claim 7 wherein the plasma gas provides between about 40% and about 60% of the energy input into the furnace.

12. A process for recovering zinc from an agglomerate containing zinc oxide and the oxide of a non-volatile metal, the process comprising reducing the oxides of zinc and the non-volatile metal within a vertical shaft furnace to form zinc and a non-volatile metal, the metallic zinc being volatilized within the shaft furnace after being reduced, feeding an oxidizing gas other than air to the vertical shaft furnace to reoxidize the metallic zinc and produce a crude zinc oxide in the vertical shaft furnace, the oxidizing gas being selected from the group consisting of carbon dioxide, steam, $HNO_3$, $NO_2$, and $SO_2$, and recovering the crude zinc oxide from an exhaust gas which exits the furnace.

13. A process as set forth in claim 12 wherein the agglomerate contains at least one alkali metal or halide.

14. A process as set forth in claim 12 wherein the oxidizing gas is carbon dioxide.

15. A process as set forth in claim 14 wherein the agglomerate contains at least one alkali metal or halide and the crude zinc oxide is recovered as part of a mixture containing at least one alkali metal or halide.

16. A process as set forth in claim 14 wherein the process additionally comprises forming a bed of lump coke in the vertical shaft furnace, feeding the agglomerate and scrap metal onto the bed of lump coke, and combusting the coke in the coke bed while blowing a plasma gas having a temperature greater than 10,000° F. into the coke bed to form a reaction zone within the coke bed, the temperature in the reaction zone being in excess of 4,000° F.

17. The process of claim 16 wherein the process additionally comprises melting the agglomerate and scrap metal fed onto the bed of lump coke to form a molten phase containing molten iron oxide and molten scrap metal, the molten phase flowing into the reaction zone and forming a film on the lump coke within the reaction zone, the iron oxide in the film being reduced by carbon from the coke to form molten iron in a solid/liquid reduction.

18. The process of claim 16 wherein the weight ratio of agglomerated EAF dust to scrap metal is between about 1:3 and 3:1.

19. The process of claim 16 wherein the plasma gas provides between about 40% and about 60% of the energy input into the furnace.

20. A process for recovering iron from an iron oxide bearing mass, the process comprising forming a bed of lump coke in a vertical shaft furnace, feeding the iron oxide bearing mass and scrap metal onto the bed of lump coke with the weight ratio of the iron oxide bearing mass to scrap metal fed being between about 1:3 and 3:1, combusting the coke in the coke bed while injecting a plasma gas having a temperature greater than about 5,000° F., melting the iron oxide bearing mass and scrap metal fed onto the bed of lump coke to form a molten phase containing molten iron oxide and molten scrap metal, the molten phase flowing into the reaction zone and forming a film on the lump coke within the reaction zone, the iron oxide in the film being reduced by carbon from the coke to form molten iron, and discharging the molten iron from the furnace.

21. A process as set forth in claim 20 wherein the iron oxide bearing mass is agglomerated EAF dust.

22. A process as set forth in claim 21 wherein the plasma gas provides between about 40% and about 60% of the energy input into the furnace.

23. A process for recovering metals from an agglomerate which contains iron oxide and zinc oxide, the process comprising forming a bed of lump coke in a vertical shaft furnace, feeding the agglomerate and scrap metal onto the bed of lump coke, combusting the coke in the coke bed while blowing a plasma gas having a temperature greater than 5,000° F. into the coke bed to form a reaction zone within the coke bed, reducing the zinc oxide to zinc metal which is vaporized and carried by an exhaust gas leaving the coke bed, melting the agglomerate and scrap metal fed onto the bed of lump coke to form a molten phase containing molten iron oxide and molten scrap metal, the molten phase flowing into the reaction zone and forming a film on the lump coke within the reaction zone, the iron oxide in the film being reduced by carbon from the coke to form molten iron, reoxidizing the zinc to zinc oxide using an oxidizing gas which is fed to the vertical shaft furnace, and recovering the reoxidized zinc oxide from the exhaust gas.

24. A process as set forth in claim 22 wherein the zinc is reoxidized to zinc oxide by carbon dioxide which is fed to the vertical shaft furnace.

25. A process as set forth in claim 22 wherein the iron oxide bearing mass is agglomerated EAF dust.

26. A process as set forth in claim 24 wherein the plasma gas provides between about 40% and about 60% of the energy input into the furnace.

27. A process as set forth in claim 24 wherein the zinc is reoxidized to zinc oxide by carbon dioxide which is fed to the vertical shaft furnace.

* * * * *